United States Patent
Finke-Anlauff

(10) Patent No.: US 6,850,226 B2
(45) Date of Patent: Feb. 1, 2005

(54) MULTIFUNCTION MOBILE COMMUNICATIONS DEVICE WITH SLIDABLE DISPLAY SCREEN

(75) Inventor: Andrea Finke-Anlauff, Braunschweig (DE)

(73) Assignee: Nokia Corporation, Espoo (FI)

( * ) Notice: Subject to any disclaimer, the term of this patent is extended or adjusted under 35 U.S.C. 154(b) by 202 days.

(21) Appl. No.: 10/037,734

(22) Filed: Nov. 9, 2001

(65) Prior Publication Data

US 2003/0090468 A1 May 15, 2003

(51) Int. Cl.⁷ .................................................. G09G 5/00
(52) U.S. Cl. ...................... 345/169; 345/168; 345/864; 455/556
(58) Field of Search ................................ 345/168, 169, 345/659, 864, 901; 455/556

(56) References Cited

U.S. PATENT DOCUMENTS

| | | | | |
|---|---|---|---|---|
| 5,189,632 A | * | 2/1993 | Paajanen et al. ............. 708/109 |
| 5,332,322 A | * | 7/1994 | Gambaro .................... 400/489 |
| 5,336,001 A | * | 8/1994 | Lichtenberg ................. 400/489 |
| 5,339,097 A | * | 8/1994 | Grant ........................ 345/168 |
| 5,548,478 A | * | 8/1996 | Kumar et al. ................ 361/681 |
| 6,067,358 A | | 5/2000 | Grant ........................ 379/433 |
| 6,125,286 A | * | 9/2000 | Jahagirdar et al. ........... 455/566 |
| 6,275,376 B1 | * | 8/2001 | Moon ........................ 361/683 |
| 6,483,445 B1 | * | 11/2002 | England ..................... 341/22 |
| 6,661,404 B1 | * | 12/2003 | Sirola et al. ................ 345/168 |

FOREIGN PATENT DOCUMENTS

| | | |
|---|---|---|
| EP | 0 998 102 A2 | 10/1999 |
| IE | S67367 | 3/1996 |
| WO | WO 98/19226 | 5/1998 |
| WO | WO 00/38322 | 6/2000 |
| WO | WO 00/54479 | 9/2000 |
| WO | WO 01/39226 A1 | 5/2001 |
| WO | WO 01/69894 A1 | 9/2001 |

* cited by examiner

*Primary Examiner*—Jimmy H. Nguyen
(74) *Attorney, Agent, or Firm*—Perman & Green, LLP

(57) ABSTRACT

A text keyboard is provided for use with an electronic device. The keyboard in mounted on a surface on the body of the device. A panel slides over said recessed surface and the panel is constructed with a display screen for observation of the user. The panel is moved to an extended position in which the keyboard is exposed.

9 Claims, 5 Drawing Sheets

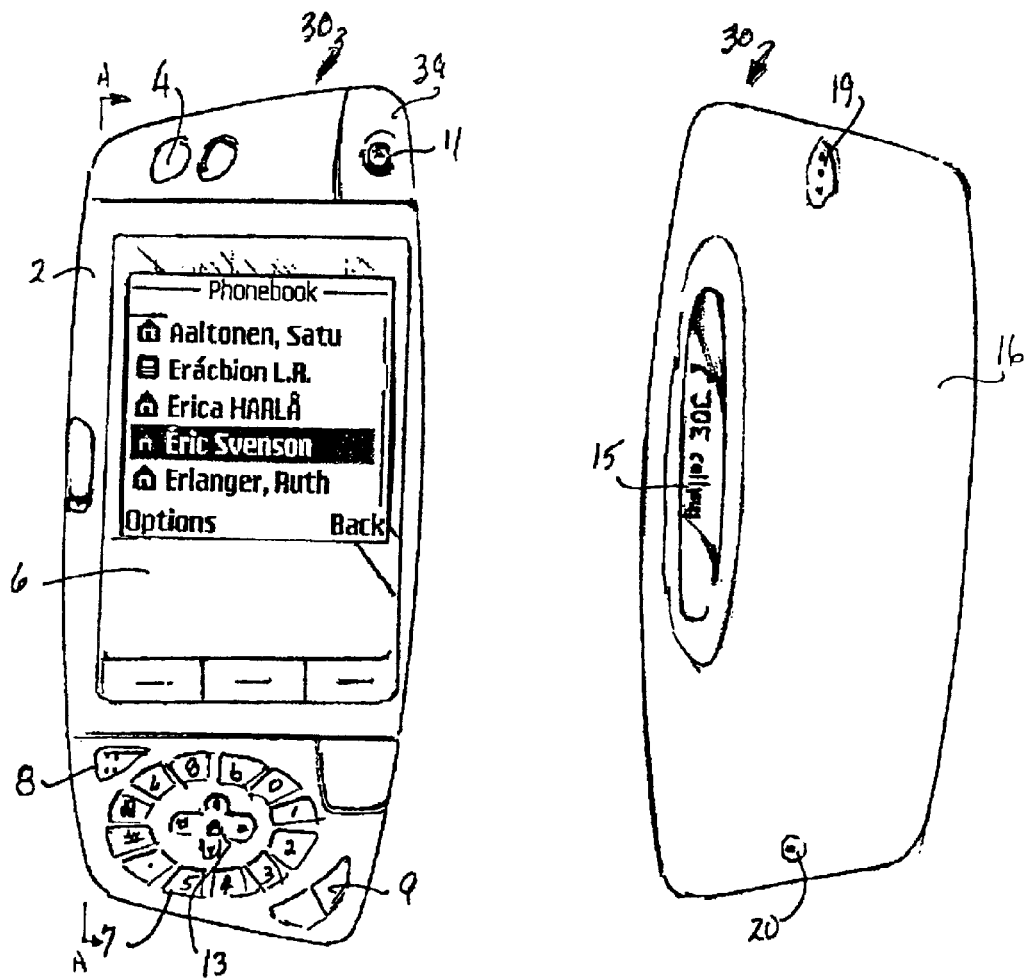
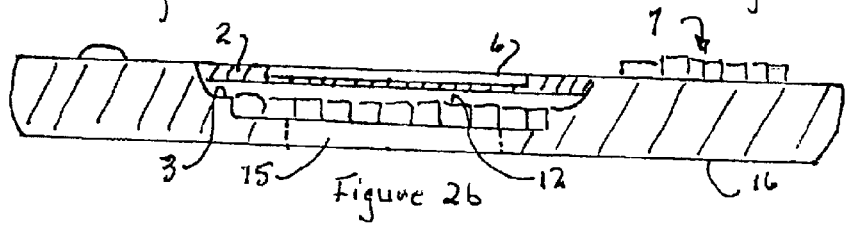

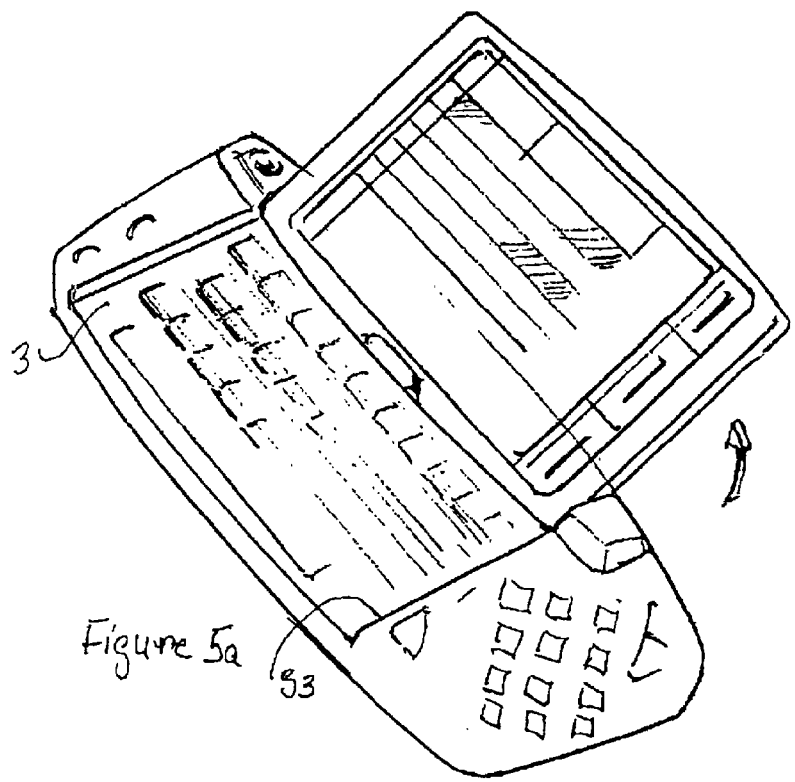
Figure 5a
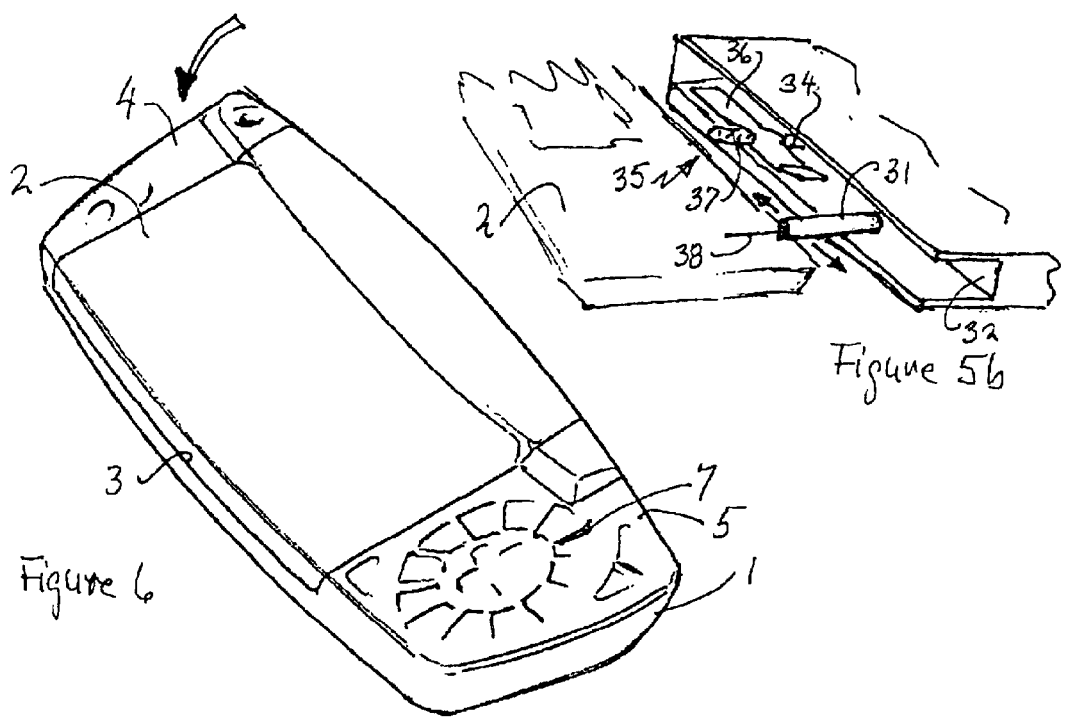
Figure 5b
Figure 6

MULTIFUNCTION MOBILE COMMUNICATIONS DEVICE WITH SLIDABLE DISPLAY SCREEN

BACKGROUND OF THE INVENTION

Mobile telephones and similar communication devices are rapidly expanding in use and function. Such devices will soon accommodate such diverse services as, Internet access, personal information management, facsimile, imaging messaging, and video conferencing, in addition to telephone communication. To accomplish this there is a need to provide keypads, function buttons, and displays that are compatible with the more complex applications to which the mobile device will be adapted. Full function text keyboards, such as the standard QWERTY typing array of keys and buttons, are difficult to provide while maintaining the compact size required in the mobile device. An equally difficult problem is presented by the need for display screens that can display the vast amount of different information that will be accessible by these devices. Such devices on the market today are cumbersome and often require several devices to obtain the full array of functions, i.e. personal digital assistant and a mobile telephone.

It is a purpose of this invention to provide a simple and inexpensive full function mobile communications device which can access many services through the use of a single device. It is another purpose of this invention to combine the personal digital assistant with a mobile telephone in a practical package of minimum dimensions. It is also a purpose of this invention to provide a configuration of keypads, button decks, and displays which provide a simple, easy to use, user interface. It is another purpose of this invention to allow the device to be operated with one hand.

SUMMARY OF THE INVENTION

A mobile communication device is designed to provide the combined functions of a personal digital assistant (PDA) and a mobile telephone. The device is constructed having a body which is defined by bottom, top, and side walls to form an enclosure which houses the internal components of the device and associated accessories. The top of the body has a recessed central portion in which a display screen panel is mounted for sliding and pivotal motion. The screen slides transverse to the longitudinal axis of the body, within the recess, between a first position in which it generally conforms to the overall contour of the body and a second position in which the screen extends externally to the body contour. In the extended position, a text keyboard, mounted on the recessed deck which forms the floor of the recessed central portion is exposed for use. On each side of the recessed central portion button decks are constructed on which can be mounted buttons or keypads suitable for the basic functioning of the communication device and its associated accessories. A digital camera is also mounted on one of the side decks on a movable bracket to accommodate video telephoning or other digital camera applications.

The display screen is viewable in either the first or second positions and may be tilted up to make viewing more convenient in the extended position. One of the side decks of the body is constructed with a telephone keypad for use with the mobile telephone function. The display may be oriented on the screen between at least two positions for reading in a longitudinal direction or a transverse direction depending on the function being used. When the text keyboard is in use the display will read longitudinally. Other functional keys are distributed on the screen panel and side decks for convenient access by the user. The mobile telephone function is designed for one hand operation.

DESCRIPTION OF THE DRAWING

The invention is described in more detail below with reference to the attached drawing in which:

FIG. 1 is a top view of the communications device with the screen oriented for mobile telephone operation;

FIG. 2a is a bottom view of the communications device in the closed position;

FIG. 2b is a sectional view taken along the section lines A—A in FIG. 1;

FIG. 5a is a perspective view of the communication device in which the display screen panel extended and tilted;

FIG. 5b is a perspective cutaway view showing one side of a mounting arrangement for the screen panel;

FIG. 6 is a perspective view of the communications device with the screen panel fully pivoted to the closed position;

DESCRIPTION OF THE PREFERRED EMBODIMENT

Figure 3:
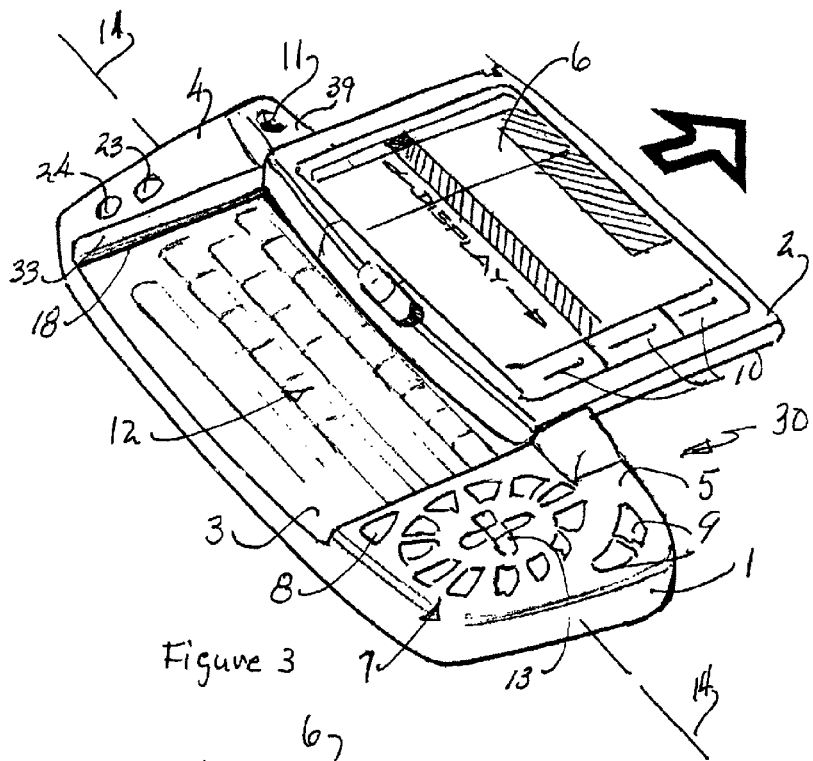
FIG. 3 is a perspective view of the communication device in which the display screen panel extended.

An electronic device 30 is constructed having a configuration of screens, text keyboard, and function keys which allow the device to provide multiple functions. The configuration is optimized for utilization of internet services through a mobile telephone to provide internet access for shopping, news, email, finance, travel and other available services. In addition personal information data processing may be provided, such as calendar, appointments, notes, contacts, and other applications provided by packaged software such as MICROSOFT OFFICE. The result is the effective combination of the functions of a personal digital assistant and a mobile telephone.

The subject mobile communication device is constructed having a body 1 which is defined by bottom, top, and side walls to form an enclosure which houses the internal components of the device and associated accessories shown generally in FIG. 5. The top of the body 1 has a recessed central portion 3 in which a display screen panel 2 is mounted for sliding and pivotal motion. The bottom surface of the recess provides a recessed deck on which is mounted a text keyboard 12, such as the QWERTY keyboard shown in FIG. 3.

The screen panel 2 slides over the keyboard 12 in a direction substantially transverse to the longitudinal axis 14 of the body 1. The screen panel 2 may be mounted on pins 31, as shown in FIG. 5b, in transverse slots 32 constructed on the sides 33 of the recess 3. Appropriate electrical connections 34 are made through the mounting pins 31 at either end of the panels travel. The screen panel 2 may be manually moved between a first position, as shown in FIG. 1, in which it generally conforms to the overall contour of the body 1 and a second position, as shown in FIG. 3, in which the screen panel 2 extends externally to the contour of body 1. A releasable locking mechanism 35, such as a spring detent 36 and groove 37 is constructed at either end of each slot to engage the mounting pins 31 and maintain the screen panel 2 in the desired position. Once extended, the screen panel 2 may be tilted upwards from the flat position to an angle, for example of 150°, to make viewing of the display 6 of screen 2 easier when using the device on a desk or other flat surface. As shown in FIG. 6, the screen panel 2 may be adapted to pivot approximately 180° to provide a cover for the device with screen 2 facing recess 3 in a protected position. As shown in FIG. 2, a window 15 is provided through the bottom 16 of body 1 to allow, at least caller identification, or other display content to be viewed, in the covered position.

Figure 4:
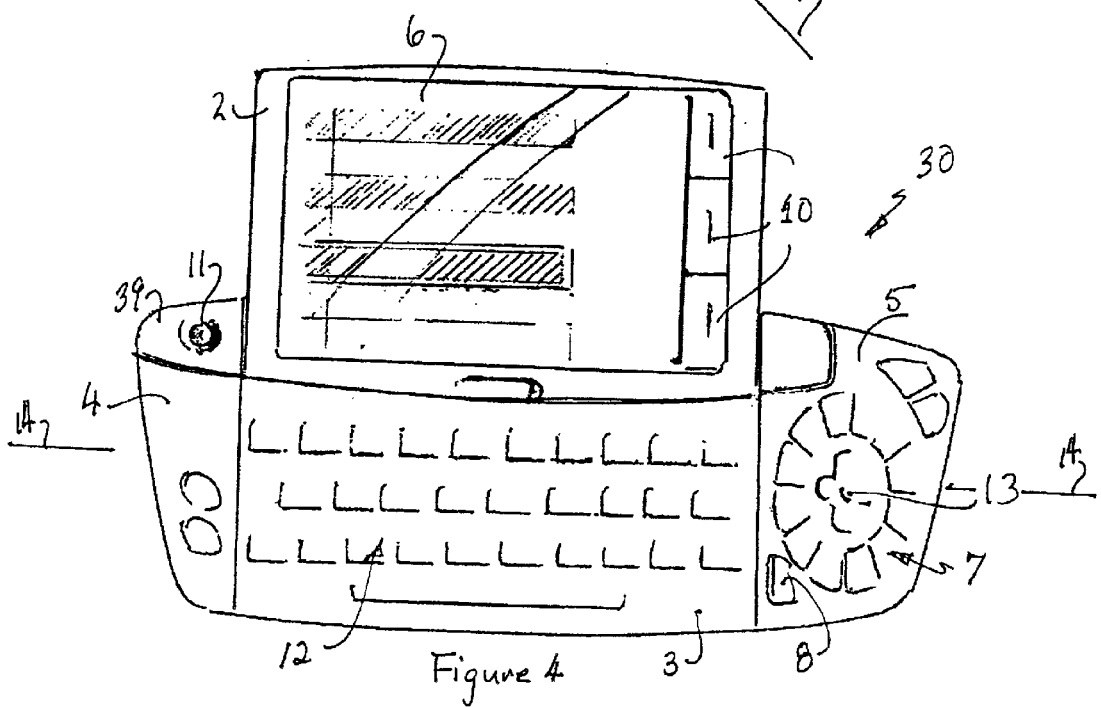
FIG. 4 is a top view of the communication device with the display screen extended.
Figure 7:
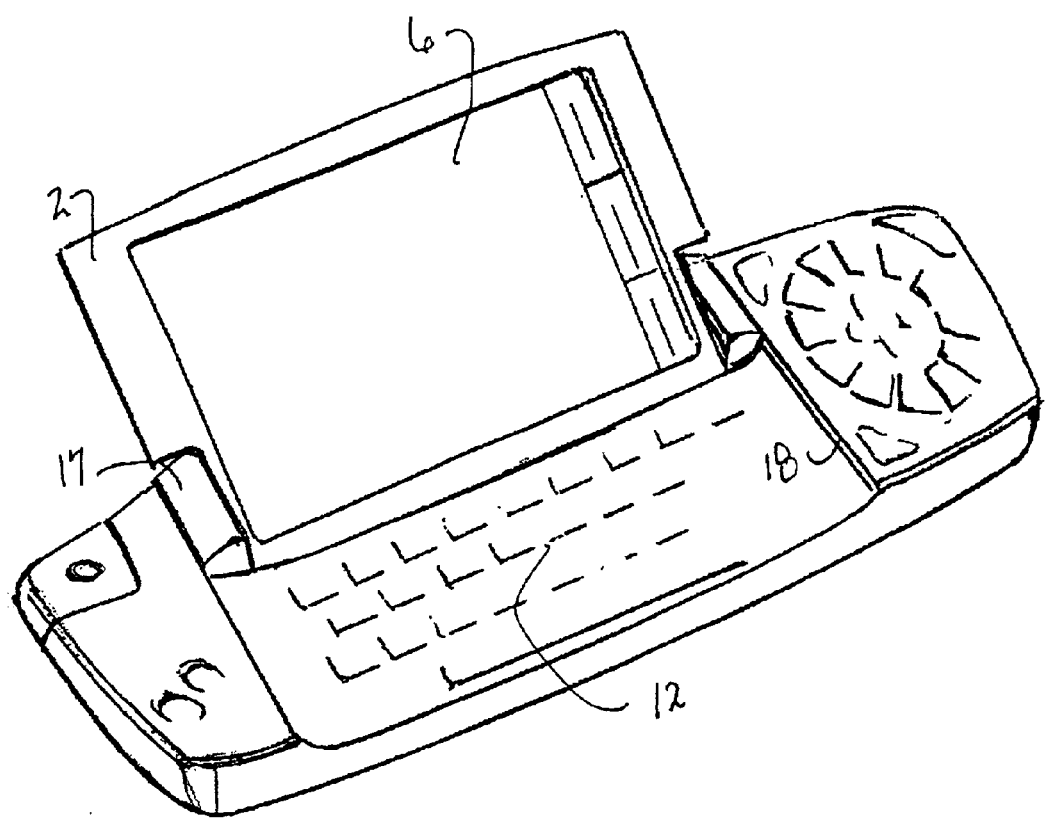
FIG. 7 is a perspective view of the communications device showing an alternative embodiment of the screen panel attachment.

In the alternate embodiment, shown in FIG. 4, the screen panel 2 is mounted on pivot pins 31 for rotation about the axis of the pins 38. An intermediate sledge element 17 supports the pins 31 for rotation. The sledge element 17 in turn is mounted to the side walls of the recess for sliding motion in a track 18. This configuration may provide a more durable electrical and mechanical connection. The sledge elements 17 could also be mounted to slide in grooves or rails formed in the top surface of the body 1. In the latter embodiment no recess need be formed or only a slight recess to provide clearance over the keyboard 12.

The panel 2 is operable in either position and the display is oriented for the most advantageous view for a particular function. The display may be graphically rotated through 90° on screen panel 2 for reading in a transverse direction or a longitudinal direction, as shown in FIGS. 1 and 3 respectively. The display orientation on screen 2 is accomplished either manually, by a switch, or automatically by instructions from the control microprocessor of the device. In the later instance, the desired orientation could be determined by the operation of software associated with a particular function or by a sensor 39 which indicates the screen panel position. The sliding operation of the screen panel 2 is arranged to trigger the display 6 to rotate to the longitudinal orientation.

In the extended position, the text keyboard 12, mounted on the recessed deck of the body 1, is exposed for use. Each side of the recessed portion of the top of the body is constructed with button decks 4 and 5 on which can be mounted buttons or keypads suitable for the basic function of the communication device and its associated accessories. A digital camera is mounted on one of the side decks on a movable bracket to accommodate video telephoning or other digital camera applications. In the alternate embodiment in which no recess is formed, a single flat deck may be formed on the top surface of the body 2. This surface may be divided into side button decks and a central text keyboard deck.

The display screen is viewable in either the first or second positions and may be tilted up, as shown in FIG. 5, to make viewing more convenient in the extended position. One of the side decks of the body is constructed with a telephone keypad 7 for use with the mobile telephone function. With the display 6 oriented in the transverse condition, the device may be operated as a standard mobile phone. The display 6 may be oriented on the screen between at least two positions for reading in a longitudinal direction or a transverse direction depending on the function being used.

Other functional keys are distributed on the screen panel, such as hard keys 21 which correspond to screen identified functions. The side decks 4 and 5 also provide a practical surface on which to mount frequently used function keys, such as cursor keys 13, send and end keys 9, application key 8, and on/off and display orientation or camera buttons 23 and 24 for convenient access by the user.

The mobile telephone function is designed for one hand operation. To facilitate this function the telephone number pad 7 may be arranged in a circle to provide more convenient access in both of the longitudinal or transverse positions of use. As shown in FIG. 5a, a similar convenience could be provided by arranging the telephone keypad skewed at a 45° angle to the longitudinal axis 14 to enable convenient use in both positions of use. For the purpose of this application, the positions of use are associated with the display orientation, i.e., the transverse position as shown in FIG. 1, and the longitudinal position, as shown in FIGS. 2–5.

The microphone 20 and earpiece 19 of mobile telephone 21 are positioned at the bottom surface 22 of body 1, as shown in FIG. 2. Earpiece 19 and microphone 20 are connected to a mobile phone transceiver contained within body 1, as is well known. The system of the multifunction device 30 is shown in general in the block diagram of FIG. 5. Main control processor 25 contains application software to provide the functions of the personal digital assistant and control the operation of the components. A selection of menus are available to allow the user to select and operate the applications provided, such as the video camera 11, calendar data 26, contact data 27, and Internet browser 28. The functions are all controlled by hard keys which have a common function in all the applications and soft keys which may have different functions depending on the application software. Screen orientation is set according to the most convenient view in each application. Control Processor 25 can instruct the display driver 29 of display 6 to rotate the display according to the software application in use. Screen orientation can also be triggered by extending the display panel. A manual override is provided by actuation of switch 23 for special uses.

For further convenience a speaker 40 is provided on side deck 4 to allow hands free operation when the text keyboard is exposed for use. This enables the user to continue to work or take notes while having a telephone conversation.

Figure 8:
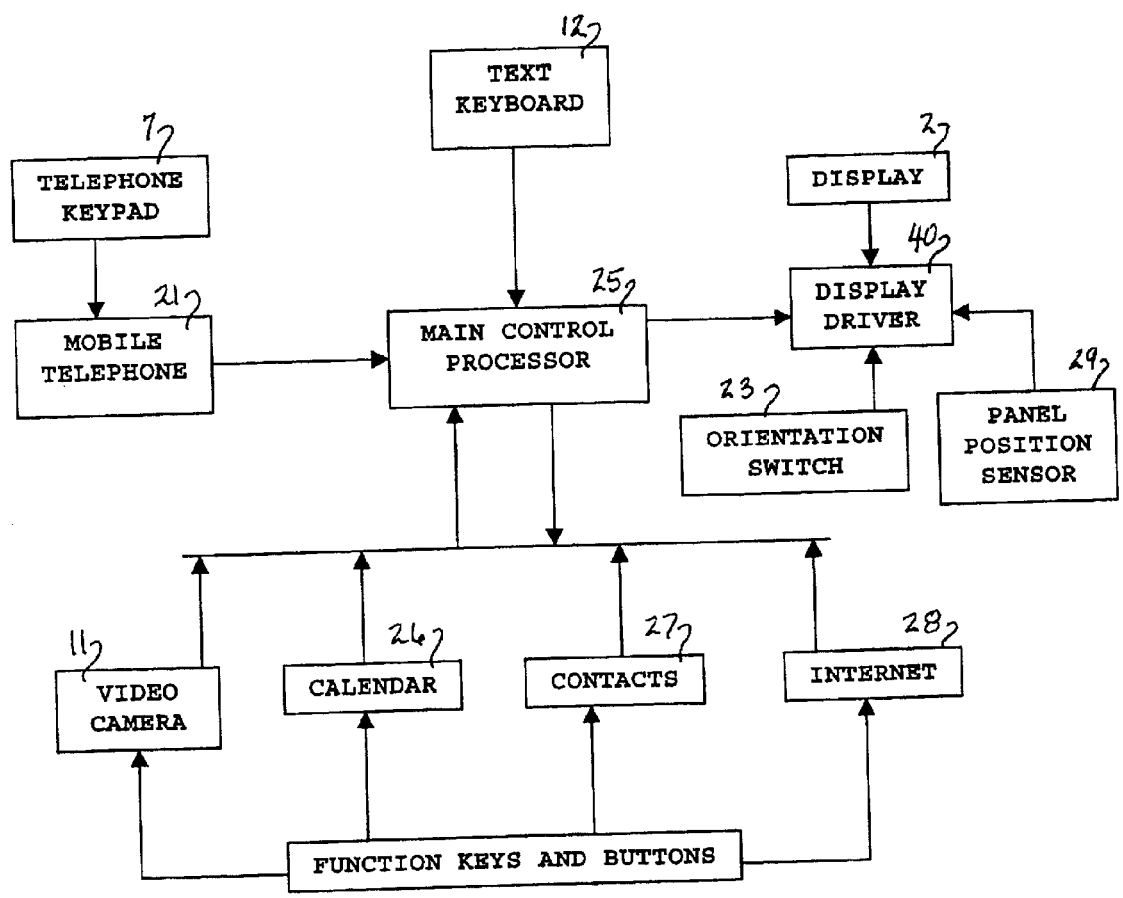
FIG. 8 is a block diagram of the system of the communication device.

In this manner a wide variety of applications can be accommodated in a very compact package with a user interface that allows convenient use of keyboard, keypads and screen. It should be noted that the applications shown in the block diagram of FIG. 8 are for illustration only and could include many others, such as facsimile, games, email, messaging to name a few.

What is claimed is:

1. A combination of a personal digital assistant and a mobile telephone device for operation in multiple applications, comprising:

a body having upper and lower faces relative to usage and a longitudinal axis;

a text keyboard mounted for use on said upper face for use with said personal digital assistant;

a panel connected to the body of the device on said upper surface, said panel having a screen for presenting a display to the user for communicating information for each of said personal digital assistant and said mobile telephone, said panel slidably mounted above said text keyboard for movement, transverse to said longitudinal axis, between a first position aligned with said body in which said display is exposed for use with said mobile telephone and a second position extending outward from said body in which said display is used for said personal digital assistant, wherein said panel covers said text keyboard in the first position and said text keyboard is exposed in the second position, and further wherein said panel is connected to said body by means which allow said panel to be pivoted, when in the second position, in a full range of motion that enables said panel to be reversed so that said display faces said upper surface for protection; and a pair of side decks constructed in the body on either side of said text keyboard, at least one of said side decks having a keypad for use with said mobile telephone.

2. A device, as described in claim 1, wherein said upper face of said body is constructed with a recessed surface with said keyboard mounted thereon and said panel is slidably mounted in said recess.

3. A device, as described in claim 2, wherein said recessed surface is constructed intermediate between the ends of the body and said two side decks are constructed on either side of said recessed surface.

4. A device, as described in claim 1, wherein said text keyboard comprises a full function QWERTY key array.

5. A device, as described in claim 1, wherein said keypad for use with said mobile telephone is comprised of keys arranged in a circular pattern.

6. A device, as described in claim 1, wherein said keypad for use with said mobile telephone is arranged at a 45° angle.

7. A device, as described in claim 1, wherein the panel is connected to the body by means of pins which are supported by an intermediate sledge element for rotation, and said sledge element in turn being mounted on the body for sliding motion thereon.

8. A device, as described in claim 1, wherein a digital camera is mounted on one of said side decks.

9. A device, as described in claim 1, wherein the bottom of the device is provided with an auxiliary display window to reveal a portion of the display.

* * * * *